(No Model.)
R. A. BERGER.
LATHE TOOL.
No. 471,839.
Patented Mar. 29, 1892.
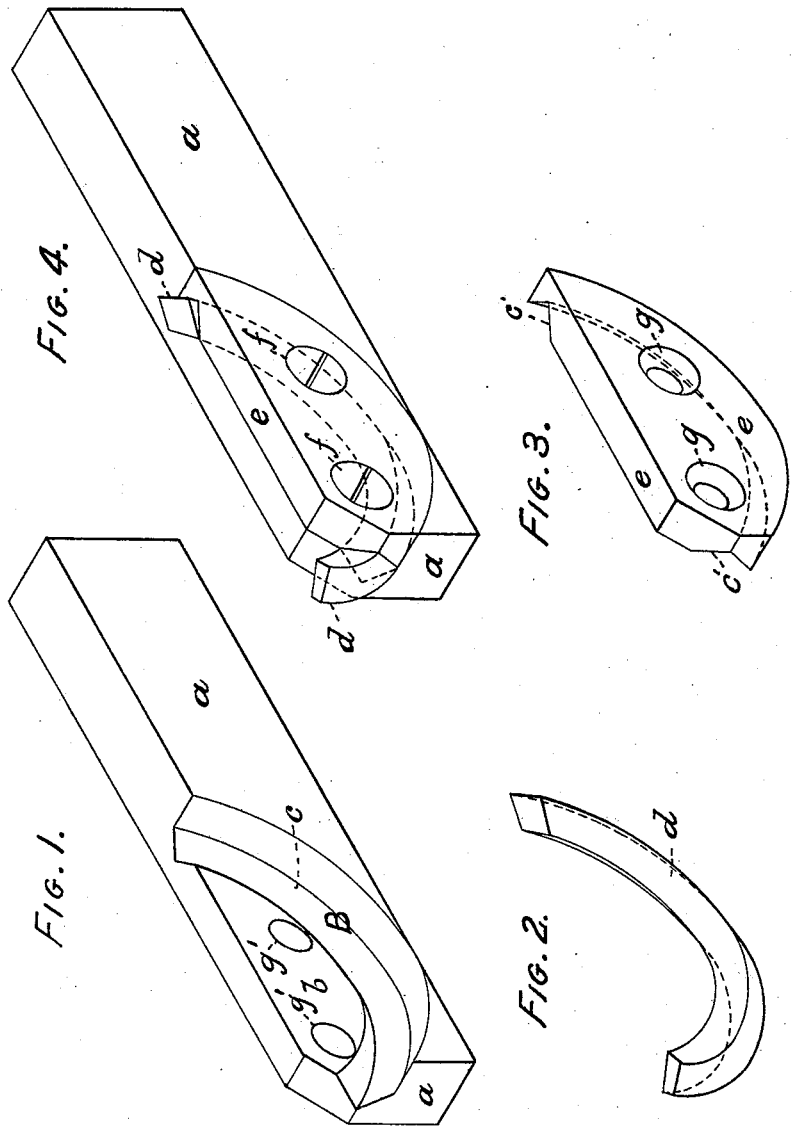
WITNESSES.
INVENTOR.
Richard A. Berger
By Ernest A. Webb
atty

UNITED STATES PATENT OFFICE.

RICHARD A. BERGER, OF BROOKLYN, NEW YORK.

LATHE-TOOL.

SPECIFICATION forming part of Letters Patent No. 471,839, dated March 29, 1892.

Application filed July 23, 1890. Serial No. 359,679. (No model.)

*To all whom it may concern:*

Be it known that I, RICHARD A. BERGER, a citizen of the United States, and a resident of Brooklyn, in the county of Kings and State of New York, have invented certain new and useful Improvements in Lathe-Tools, of which the following is a specification.

My invention relates to improvements in lathe or cutting tools for metal-working machines, and particularly to that class of tools employing a curved cutting-bar, removably secured in a shank or body, the object being to produce a tool cheaper in manufacture and more durable than the solid forged tools in common use, and yet capable of use in machines of ordinary construction and in all such positions as the solid forged tools may be used.

To this end my invention consists in the combination, in a lathe-tool, of a straight bar or shank cut away at one end to form an open-shouldered recess, the vertical wall of which is provided with an open arc-shaped recess, an arc-shaped cutting-tool, and a clamping device or holder adapted to fit snugly in the shouldered recess and provided with an arc-shaped recess to correspond with the recess in the vertical wall and the shape of the cutter, and means for adjustably securing said holder in place to sustain the cutter, as hereinafter more particularly described.

In the accompanying drawings, in the several figures of which like parts are similarly designated, Figure 1 is a perspective view of the stock or body of my improved tool. Fig. 2 is a perspective view of the cutter-bar. Fig. 3 is a perspective view of the holder, and Fig. 4 is a perspective view of the complete tool.

$a$ is the main body or shank of the tool, recessed at B. This recess has a vertical wall $b$ and a grooved circular bottom $c$, within which fits the curved cutter-bar $d$. This cutter-bar is composed of suitable material and is of any desired form.

$e$ is a holder, which fits tightly over the bar $d$, as shown in Fig. 4, and which clamps the cutter-bar firmly to the shank by means of the screws $f f$, entering the screw-holes $g\ g$ in the holder and $g'\ g'$ in the shank. This cutter-bar may be adjusted in the shank so as to compensate for wear or be of any desired height, according to the character of the work for which it may be employed. Practically there is no side play, as the cutter is moved only in the direction of its length, and the tool is very strong, as, from its construction, a portion of the bar or shank $a$ is under and supporting the cutter-bar $d$, taking up and transmitting away the strains and shocks which it receives during the operation of cutting. The bar or shank $a$ is held in the tool-post of the lathe in the usual manner and does not differ in size or appearance from the solid-forged tools now in use, one of its chief points of merit being that, while it is a compound tool capable of adjustment and long use before finally wearing out, it can be used in any position and for any purpose in and for which the ordinary forged tool can be used, as already set forth. My invention also differs from the curved cutting-tools already in use, in that the cutter is adjustably held in the bar or shank of the tool independently of the tool-post and without necessitating any enlargement of the bar or shank to receive and hold the cutter, which enlargement would greatly limit the range of use for such a tool.

It is obvious from the foregoing that the tool is particularly valuable from the fact that the clamping device or holder fitting snugly within the shouldered recess in the end of the tool affords a firm and rigid support for the cutter-bar and from its position affords a means of easy adjustment or removal of the cutter-bar and ready access to the shouldered recess in the shank.

I am aware that it is not new to secure an arc-shaped tool in a two-part bar or shank and to clamp the parts together through the medium of the "puppet-screw" of the lathe; but this construction necessitates the loosening or removal of the shank from the tool-post of the lathe, and I do not wish to be understood as claiming any such construction; nor do I wish to claim, broadly, the idea of cutting away one end of the shank to receive a clamping device and adjustably securing the tool between such cut-away portion and a clamping device, as I am aware that such general construction is not new; but ·

What I claim as my invention, and desire to secure by Letters Patent, is—

The combination, in a lathe-tool, of a straight holding bar or shank cut away at one end to form a recess with an arc-shaped side wall, the bottom of said recess formed with an arc-shaped tool-seat, a clamping device adapted to fit within the arc-shaped recess of the holding bar or shank and supported by the vertical wall thereof and provided with a tool-seat corresponding with the tool-seat in the shank, an arc-shaped cutting-tool, and means, substantially such as described, for adjustably securing the clamping device in place.

Signed at New York, in the county of New York and State of New York, this 24th day of June, A. D. 1890.

RICHARD A. BERGER.

Witnesses:
E. IRVING CARR,
E. V. MYERS.